US008435118B2

(12) United States Patent
Beerhorst

(10) Patent No.: US 8,435,118 B2
(45) Date of Patent: May 7, 2013

(54) WAGERING GAME BONUS SOUND INTEGRATION

(75) Inventor: Ralph Beerhorst, Evanston, IL (US)

(73) Assignee: WMS Gaming Inc., Waukegan, IL (US)

( * ) Notice: Subject to any disclaimer, the term of this patent is extended or adjusted under 35 U.S.C. 154(b) by 184 days.

(21) Appl. No.: 12/742,074

(22) PCT Filed: Nov. 7, 2008

(86) PCT No.: PCT/US2008/012565
§ 371 (c)(1),
(2), (4) Date: May 7, 2010

(87) PCT Pub. No.: WO2009/061466
PCT Pub. Date: May 14, 2009

(65) Prior Publication Data
US 2010/0273555 A1 Oct. 28, 2010

Related U.S. Application Data

(60) Provisional application No. 60/986,672, filed on Nov. 9, 2007.

(51) Int. Cl.
*A63F 9/24* (2006.01)
*A63F 13/00* (2006.01)

(52) U.S. Cl.
USPC .......... 463/35

(58) Field of Classification Search .......... 463/35, 463/42
See application file for complete search history.

(56) References Cited

U.S. PATENT DOCUMENTS 6,554,703 B1 4/2003 Bussick et al.
6,561,908 B1 5/2003 Hoke
6,638,169 B2 10/2003 Wilder et al.
6,729,618 B1 5/2004 Koenig et al.
6,729,955 B2 5/2004 Bennett et al.
6,769,985 B1 8/2004 Laakso
6,843,723 B2 1/2005 Joshi
6,848,996 B2 2/2005 Hecht
6,923,718 B2 8/2005 Brossard
6,935,955 B1 8/2005 Kaminkow
6,939,226 B1 9/2005 Joshi
6,960,136 B2 11/2005 Joshi
6,974,385 B2 12/2005 Joshi
6,991,543 B2 1/2006 Joshi
7,105,736 B2 9/2006 Laakso
(Continued)

OTHER PUBLICATIONS

"International Application Serial No. PCT/US2008/012565, Search Report mailed Jan. 15, 2009", 4 pgs.
(Continued)

*Primary Examiner* — David L Lewis
*Assistant Examiner* — Shauna-Kay Hall
(74) *Attorney, Agent, or Firm* — Schwegman Lundberg & Woessner, P.A.

(57) ABSTRACT

A computerized wagering game system includes a wagering game module that is operable to present a wagering game upon which monetary value can be wagered, and an audio system. The audio system is operable to play a bonus sound and a bang-up sound at the same time, such that the bonus and bang-up sounds are synchronized rhythmically, such as by starting play of a bonus sound track and a bang-up sound track having synchronized rhythm at the same time, and varying the volume of the bang up sound track to make it audible when desired.

16 Claims, 4 Drawing Sheets

U.S. PATENT DOCUMENTS

| | | | | |
|---|---|---|---|---|
| 7,355,112 | B2 | 4/2008 | Laakso | |
| 7,364,508 | B2 | 4/2008 | Loose et al. | |
| 7,367,886 | B2 | 5/2008 | Loose et al. | |
| 7,479,063 | B2 | 1/2009 | Pryzby et al. | |
| 2003/0073489 | A1 * | 4/2003 | Hecht et al. | 463/35 |
| 2003/0073491 | A1 * | 4/2003 | Hecht et al. | 463/35 |
| 2005/0051021 | A1 * | 3/2005 | Laakso | 84/615 |
| 2005/0054440 | A1 | 3/2005 | Anderson et al. | |
| 2005/0124415 | A1 | 6/2005 | Centuori | |
| 2005/0164785 | A1 | 7/2005 | Connelly | |
| 2005/0164786 | A1 * | 7/2005 | Connelly | 463/35 |
| 2005/0164787 | A1 | 7/2005 | Connelly | |
| 2005/0164788 | A1 | 7/2005 | Grabiec | |
| 2005/0277469 | A1 | 12/2005 | Pryzby et al. | |
| 2005/0282631 | A1 | 12/2005 | Bonney et al. | |
| 2006/0009285 | A1 | 1/2006 | Pryzby et al. | |
| 2006/0046829 | A1 | 3/2006 | White | |
| 2007/0006708 | A1 | 1/2007 | Laakso | |
| 2007/0036368 | A1 | 2/2007 | Hettinger et al. | |
| 2007/0173309 | A1 | 7/2007 | Rigsby | |
| 2007/0293304 | A1 | 12/2007 | Loose et al. | |
| 2008/0113716 | A1 | 5/2008 | Beadell et al. | |
| 2008/0161108 | A1 | 7/2008 | Dahl et al. | |
| 2008/0242411 | A1 | 10/2008 | Connelly | |
| 2009/0170597 | A1 | 7/2009 | Bone | |
| 2009/0186696 | A1 | 7/2009 | Shai-Hee | |
| 2009/0298579 | A1 | 12/2009 | Radek et al. | |

OTHER PUBLICATIONS

"International Application Serial No. PCT/US2008/012565, Written Opinion mailed Jan. 15, 2009", 6 pgs.

* cited by examiner

WAGERING GAME BONUS SOUND INTEGRATION

RELATED APPLICATION

This patent application is a U.S. National Stage Filing under 35 U.S.C. 371 from International Patent Application Serial No. PCT/US2008/012565, filed Nov. 7, 2008, and published on May 14, 2009, as WO 2009/061466 A1, which claims the priority benefit of U.S. Provisional Patent Application Ser. No. 60/986,672 filed Nov. 9, 2007, and entitled "WAGERING GAME BONUS SOUND INTEGRATION," the contents of which are incorporated herein by reference in their entirety.

FIELD OF THE INVENTION

The invention relates generally to wagering game audio, and more specifically to integrating bonus sounds and bang-up sounds in a wagering game machine.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games often do not rely on the dealer or other game players to facilitate game play and to provide an entertaining game playing environment, but rely upon the presentation of the game and environment generated by the wagering game machine itself. Incorporation of audio, video, and mechanical features into wagering game systems enhance the environment presented are therefore important elements in the attractiveness and commercial success of a computerized wagering game system. Further, a variety of network configurations and capabilities are becoming increasingly common, including local and wide area progressive games, downloadable games, and remotely managed wagering game systems.

What distinguishes one wagering game from another in the competitive wagering game market is often therefore the quality and novelty of presentation of the game, including video, graphics, and audio. It is therefore desirable to provide quality audio and video presentation of the wagering game to attract and retain game players, as well as to sell wagering games and wagering game machines.

SUMMARY

Various example embodiments of the invention comprise a computerized wagering game system, including a wagering game module that is operable to present a wagering game upon which monetary value can be wagered, and an audio system. The audio system is operable to play a bonus sound and a bang-up sound at the same time, such that the bonus and bang-up sounds are synchronized rhythmically, such as by starting play of a bonus sound track and a bang-up sound track having synchronized rhythm at the same time, and varying the volume of the bang up sound track to make it audible when desired.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Some example embodiments of the invention comprise a computerized wagering game system, including a wagering game module that is operable to present a wagering game upon which monetary value can be wagered, and an audio system. The audio system is operable to play a bonus sound and a bang-up sound at the same time, such that the bonus and bang-up sounds are synchronized rhythmically, such as by starting play of a bonus sound track and a bang-up sound track having synchronized rhythm at the same time, and varying the volume of the bang up sound track to make it audible when desired.

Figure 1:
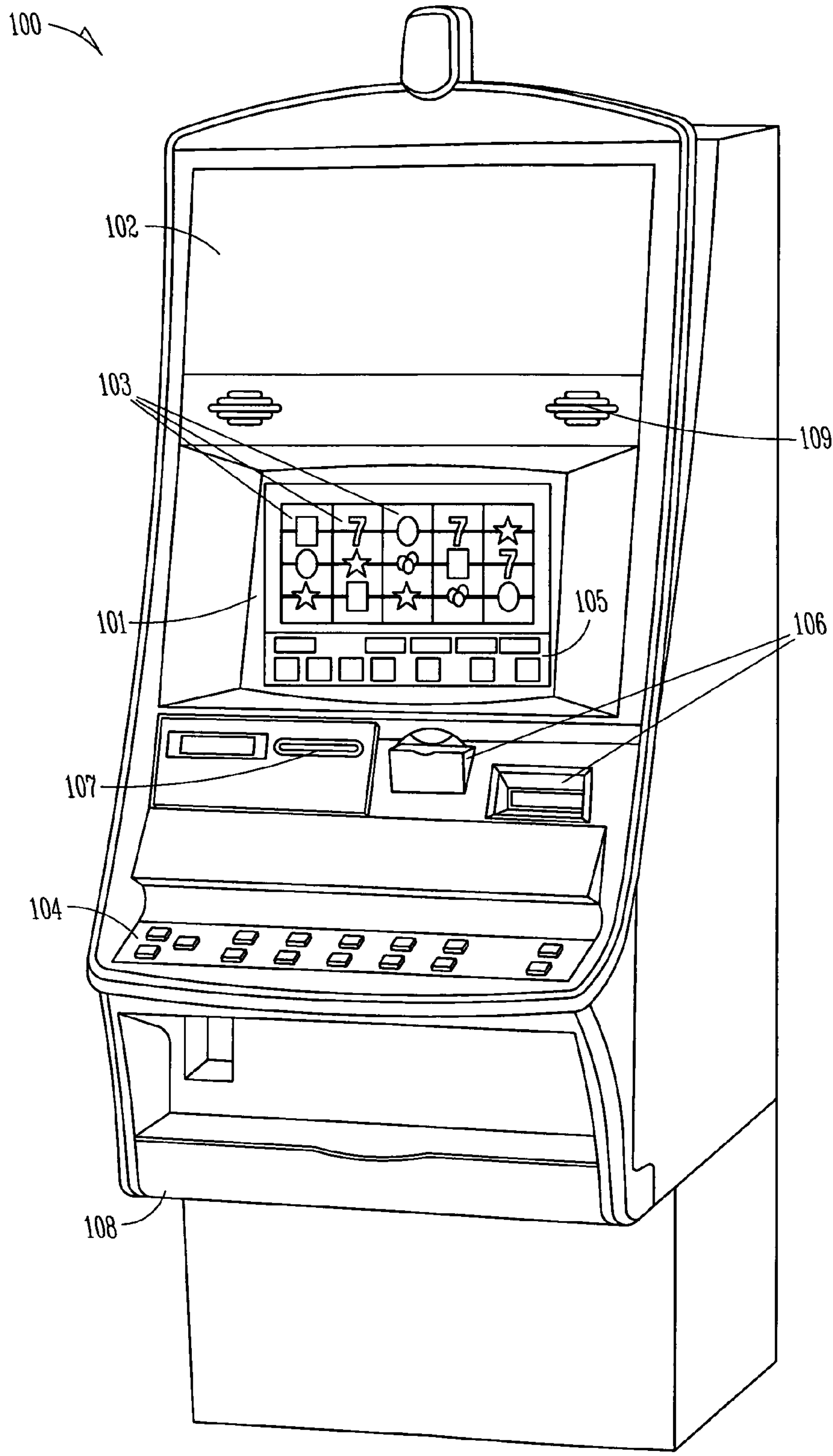
FIG. 1 shows a typical computerized wagering game machine, as may be used to practice some example embodiments of the invention.

FIG. 1 illustrates a typical single player computerized wagering game machine, as may be used in some embodiments of the present invention. The computerized gaming system shown generally at 100 is a video wagering game system, which displays information for at least one wagering game upon which monetary value can be wagered on video display 101. In a further example, a second video display 102 is provided as a part of a top-box assembly, such as to display a bonus game or other information. Video displays 101 and 102 are in various embodiments a CRT display, a plasma display, an LCD display, a surface conducting electron emitter display, an OLED display, or any other type of display suitable for displaying electronically provided display information. Alternate embodiments of the invention will have other game indicators, such as mechanical reels instead of the video graphics reels shown at 103 that comprise a part of a video slot machine wagering game.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold 'em games. The wagering game is played and controlled with inputs such as various buttons 104 or via touchscreen overlay buttons 105 on video screen 101. In some alternate examples, other devices such as pull arm are used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 106 or a secure user identification module interface 107, and winnings are returned via the returned value card or through the coin tray 108. Sound is also provided through speakers 109, typically including audio indicators of game play, such as reel spins, credit bang-ups, and environmental or other sound effects or music to provide entertainment consistent with a theme of the computerized wagering game.

In some further embodiments, the wagering game machine is coupled to a network, and is operable to use its network connection to receive wagering game data, track players and monetary value associated with a player, and to perform other such functions. In other embodiments, the wagering game system is a portable wagering game system, or has another format different from that illustrated in FIG. 1. In one such example, the wagering game system is a game table, having one or more display surfaces and one or more speakers to interact with multiple wagering game players positioned around the table.

Figure 2:
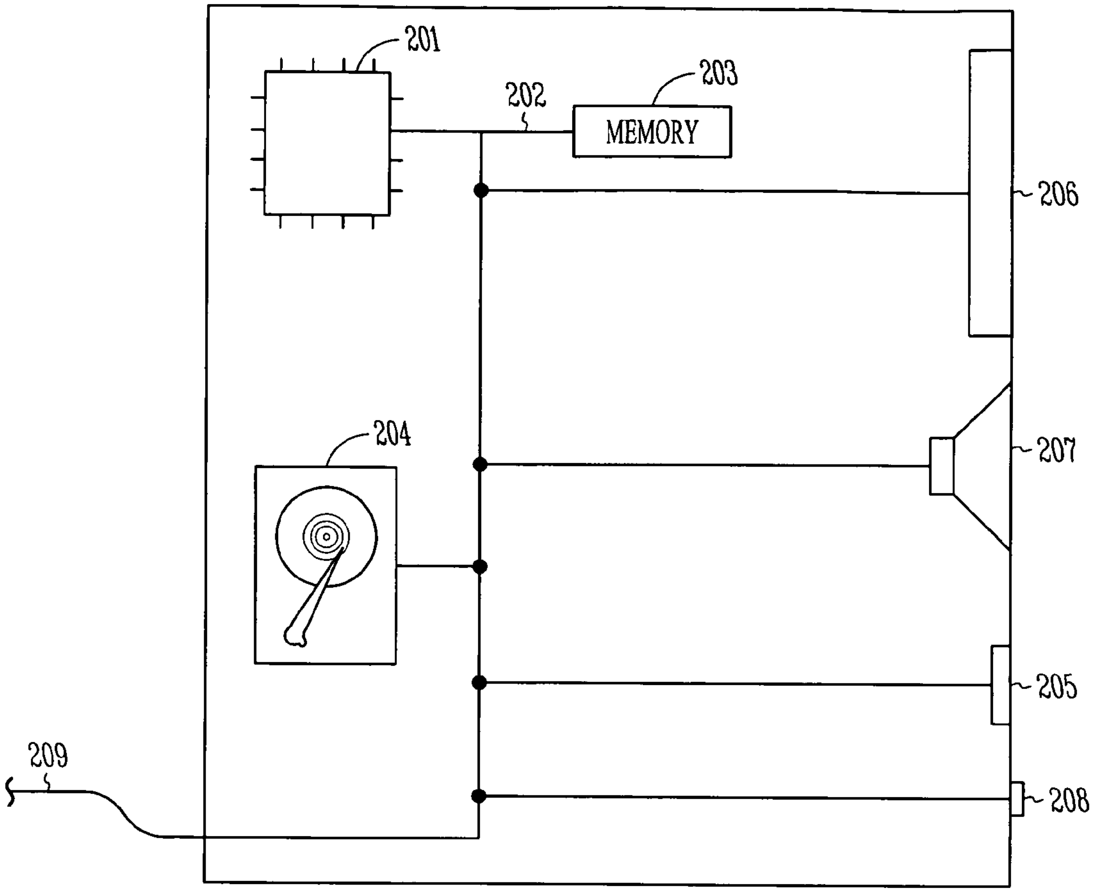
FIG. 2 is a block diagram of a wagering game system, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or Blu-Ray storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering gape server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof. The wagering game machine is coupled to other wagering game machines, and to various other elements such as game servers, accounting servers, or community or progressive game servers via the network connection 209, and exchanges data with these machines via the network connection.

In many wagering games, such as video poker or reel slot machine wagering games, distinct bonus games are featured in addition to traditional game play. The bonus game is triggered by passage of time, a certain amount of game play or wagering, or by other events, and gives the game player an opportunity to earn winnings beyond what has already been won in regular game play. In some embodiments, bonus games include special multimedia presentation elements, including a bonus game audio track such as music, and other sounds such as credit bang-up sounds that play as bonus credits accumulate or are added to a game player's winnings.

In one such bonus game, the bonus track is a song that is played repeatedly during the bonus game, or that "loops" by playing over again once the end of the track is reached. The bonus track is related to a theme of the wagering game, such as wild west music for a western-themed game, music from a movie for a movie-themed game, or music having a feel and tempo appropriate to a game theme. In a typical bonus game, the accumulated bonus credits or winnings are added to the game player's credits, such as by adding them at the conclusion of the bonus game or at various points during bonus game play. The credits are often incremented in steps rather than added all at once, for dramatic effect and to demonstrate the magnitude of the bonus winnings, in a process known as credit bang-up or simply bang-up. The credit bang-up is often accompanied by sound, such as a bell ringing as each winnings increment is added to the game player's total credits or winnings.

But, the credit bang-up sound can also be a distraction from the game's theme, such as from the bonus game soundtrack or other multimedia elements of the bonus game presentation. Some embodiments of the invention therefore seek to better integrate credit bang-up sounds in a bonus game, such as by playing a bonus game track that is synchronized with a credit bang-up track.

In one such embodiment, the bonus track accompanying a bonus game is played along with a credit bang up sound track, such that the two tracks are played in synchronization with each other. When each track is developed having a complimentary rhythm, the tracks will sound as though they are being played together in synchronization when both are audible. For example, a bonus track that comprises a musical song may be started at the same time as a bonus track having sounds that compliment the theme of the song, such as fishing reels spinning for a fishing-themed bonus game and bonus song, guns shooting for a wild west-themed bonus game and song, or people chanting a word or instruments playing to compliment other songs.

The bang-up sound thereby provides a distinct audio indicator of credit bang-up, while being consistent with the bonus song and theme of the wagering game. In one example, a bonus tune track that includes an entire song loops, such that when the end of the file is reached it begins again from the very beginning and continues to play over and over until it is cut off with a stop command. A bangup tune is written that is rhythmically and harmonically compatible with the bonus tune and that is the identical length of the bonus tune, and also loops identically as the bonus tune. The bangup tune may contain traditional bangup elements such as a chime mixed with instrumental elements or sound effects that complement the bonus tune. When the bonus tune is triggered, the bangup tune is also simultaneously triggered, but on a separate musical track, so as not to cut off the bonus tune. Only the bonus tune is heard initially, because the bangup tune is muted. When the bangup is called, the bangup music is unmuted and plays along with the bonus tune. Also, when the bangup is called, the bonus tune is lowered in volume or "ducked" to give greater prominence to the bangup music. When the award is done banging up, the bangup tune is remuted, and the bonus tune returns to its previous full volume.

This method works for unlimited layers of bangups. For example, if the game required 7 levels of bangups, seven bangup tunes would then be triggered simultaneously with the bonus tune with all of the bangup tunes being muted, and depending on which level of bangup the game called, such as bangup level 3 for example, then only the track with bangup level 3 would be unmuted.

Multiple bangup tracks are used in some example embodiments such that the bangup tracks are each independent, and reflect various levels of bonus achievement or other differences. The tracks are unmuted for an appropriate period of time during credit bangup, and may have various sounds included for varying lengths depending on the amount of time that the different levels of bangup may be played. In another example, two or more bangup tracks are complimentary, and can be played together to enhance or build upon the bangup sound presentation.

In traditional wagering game machines, the bangup sound often obscures the bonus music that it plays over because the traditional bangup in many wagering games has typically involved repetition of a simple musical phrase over and over and is not synchronized with any other sounds. Sometimes that is intentional and effective. However, there is a problem if the bonus tune moves around a great deal harmonically, that is, if it changes tonality or key centers. When a repetitive bangup is introduced over such a tune, the clashing effect can be grating and unpleasing to the ear.

In the past, solutions have been twofold—in some examples, songs stay in a certain tonal area to accommodate the simple bangups, or bangup sounds are not musical and do not clash with the tone or rhythm of other music. These solutions do not address the harmonic clashes that happen when the bangup begins at some random point within the harmonic structure of the bonus tune. Some embodiments of the invention solve this problem by ensuring that no matter when the bangup is called, it will always sound exactly as the composer designed it to sound at that particular point in the bonus tune. This opens up a new world of creativity to the composer of the bonus tune and the bangup, since he is no longer constrained by tonality, harmonic structure or tempo.

Figure 3:
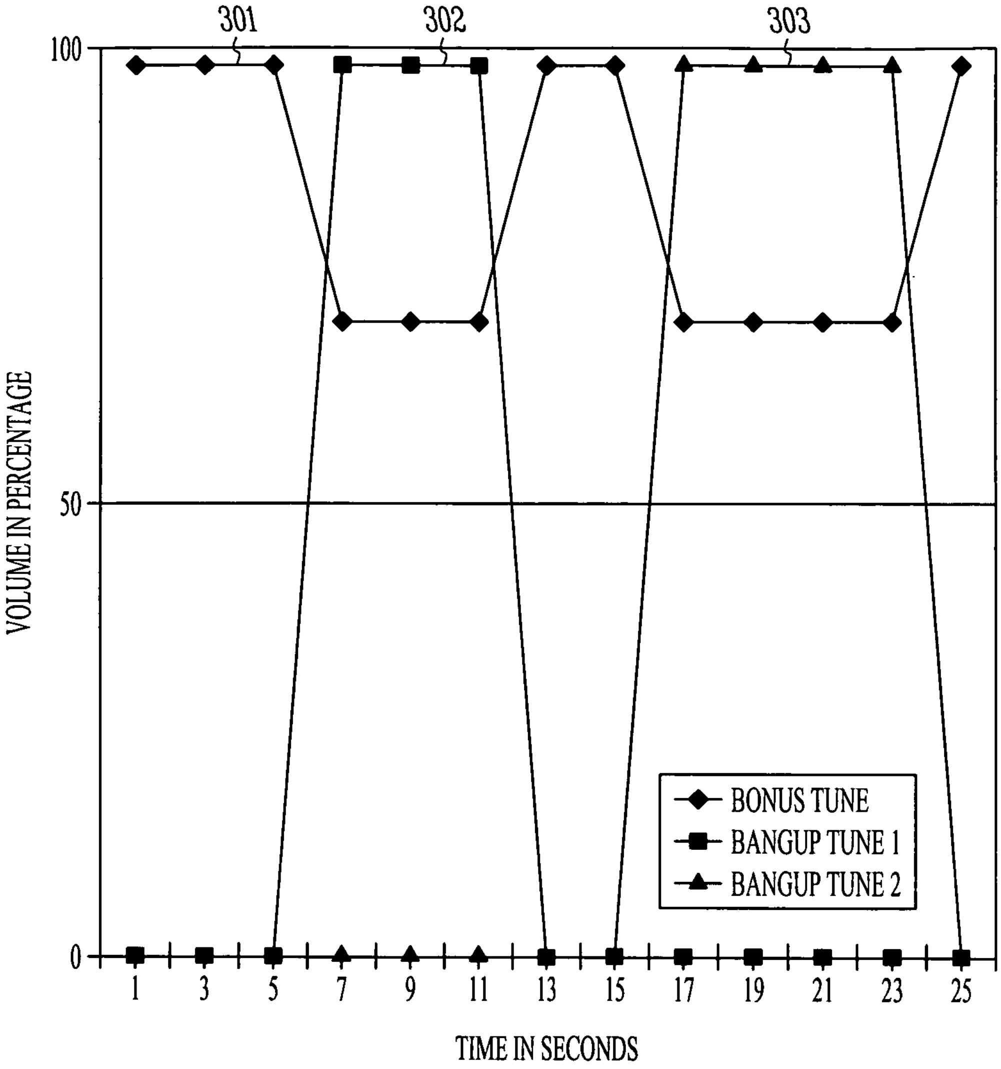
FIG. 3 is a diagram illustrating playing of a synchronized bonus track and multiple bangup sound tracks, consistent with an example embodiment of the invention.

FIG. 3 illustrates multiple bonus game tracks played in synchronization with a credit bang-up sound track, consistent with an example embodiment of the invention. The bonus tune begins playing at second one, as shown at 301. A few seconds later, the bonus tune is reduced in volume, and bangup sound 302 is played at full volume along with the bonus tune as shown by the change in volume of bonus tune 301 and bangup sound 302. The bangup sound 302 is eventually muted and the bonus tune returns to full volume, until a second bangup sound 303 is played. The second bangup sound is shown played at full volume at 303, and the bonus sound is again muted while the bonus sound plays. In alternate embodiments, only a single bangup sound track is played during a credit bangup, or multiple credit bangup sounds are played at the same time.

Figure 4:
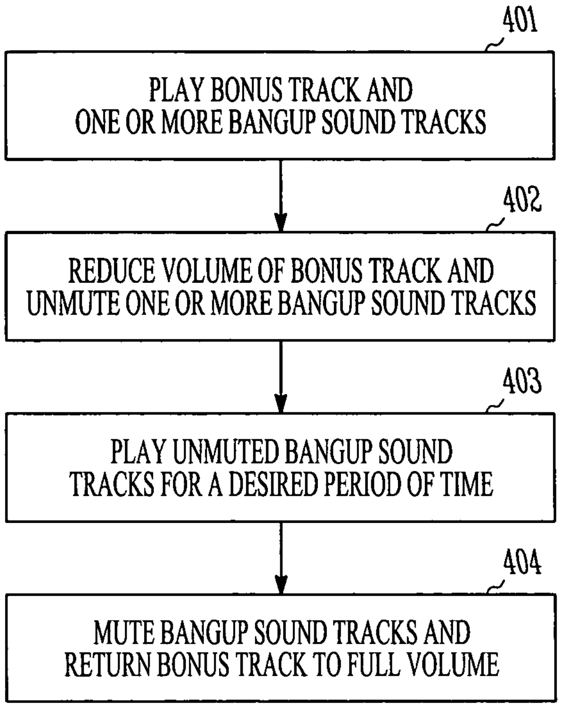
FIG. 4 is a flowchart illustrating a method of playing a bangup sound track in synchronization with a bonus track, consistent with an example embodiment of the invention.

FIG. 4 is a flowchart, illustrating an example method of playing bangup sounds in synchronization with a bonus track. At 401, the bonus track starts playing, and one or more bangup sound tracks begin to play at the same time. In this example, the bonus track and the bangup sound tracks are the same length, and played in synchronization with one another. The bonus track is played at normal volume, such as the 100% volume level shown in FIG. 3. At 402, the volume level of the bonus track is "ducked" or reduced to enhance audibility of the bangup sound track, and the bangup track is unmuted. After the bangup sound track or tracks have played for the desired period of time at 403, the bangup sound track or tracks are again muted at 404, and the bonus track continues to play at regular volume.

Various embodiments of the invention provide a variety of benefits to the game designer, and to the game player. One benefit of some embodiments is that the bangup sound can now follow any bonus tune harmonically. There is no more randomness in how the bangup will sound when it is introduced over the bonus tune, therefore the composer is completely freed up to write more creatively. Also, complex licensed music that we purchase could now be used as bonus music and interact with the bangup in an aesthetically pleasing way. Second, the bangup sound can now follow any bonus tune rhythmically with predictability and composed variety, if desired. Use of markers or synchronized playback of the tracks eliminates randomness as to when the bangup starts relative to the beat of the bonus tune. Also, The bangup sound can now complement the bonus tune, such as where the bangup sound introduces repetitive bell chimes, claps, horn stabs and a crowd shouting "Go! Go! Go!" over a rockabilly bonus tune. Rather than "taking over" the bonus tune, it augments it and adds excitement. Further, different bangup levels can now be tailored to build on top of one another, adding a new dimension of excitement.

The examples presented here have shown how use of bangup sounds played in synchronization with a bonus tune can add to the game play experience, while adding flexibility and the ability to more creatively integrate complementary sounds during the game design process. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system configured to conduct a wagering game, the wagering game including at least one bangup event in which accumulated awards are incrementally added to a player's credits, the wagering game system comprising:

one or more input devices;

one or more display devices;

one or more audio output devices;

one or more processors; and one or more memory devices storing instructions that, when executed by at least one of the one or more processors, cause the wagering game system to:

receive, via at least one of the one or more input devices, an input indicative of a wager from a player to initiate the wagering game;

display, via at least one of the one or more display devices, the wagering game to the player;

trigger play of a bonus song on a first audio track and simultaneously begin to play a bangup tune on a second audio track such that a rhythm of the bonus song and a rhythm of the bangup tune are synchronized to one another, wherein both the bonus song and the bangup tune have equal lengths and the second audio track is initially muted to reduce audibility of the bangup tune; and in response to the at least one bangup event occurring during the wagering game, unmute the second audio track such that the bonus song and the bangup tune are simultaneously audible via at least one of the one or more audio output devices.

2. The computerized wagering game system of claim 1, wherein at east one of the bonus song and the bangup tune are prerecorded audio files.

3. The computerized wagering game system of claim 1, wherein playing the bonus song automatically begins play of the bangup tune.

4. The computerized wagering game system of claim 1, wherein the bangup tune is made audible by selectively varying a volume of the second audio track in accordance with a duration of the at least one bangup event.

5. The computerized wagering game system of claim 1, wherein beginning to play the bangup tune comprises beginning to play a plurality of bangup audio tracks simultaneously and selectively unmuting one or more of the bangup audio tracks in accordance with a duration of the at least one bangup event.

6. The computerized wagering game system of claim 1, wherein a volume of the first audio track is decreased relative to a volume of the second audio track during play of the bangup tune.

7. A computer-implemented method of conducting a wagering game on a wagering game machine, the wagering game machine having one or more input devices, one or more display devices, one or more audio output devices, and one or more processors, the wagering game including at least one bangup event in which accumulated awards are incrementally added to a player's credits, the method comprising:

receiving, via at least one of the one or more input devices, an input indicative of a wager from a player to initiate the wagering game;

displaying, via at least one of the one or more display devices, the wagering game to the player;

triggering, by at least one of the one or more processors, play of a bonus song on a first audio track and simultaneously beginning to play a bangup tune on a second audio track such that a rhythm of the bonus song and a rhythm of the bangup tune are synchronized to one another, wherein both the bonus song and the bangup tune have equal lengths and wherein the second audio track is initially muted to reduce audibility of the bangup tune; and in response to the at least one bangup event occurring during the wagering game, unmuting the second audio track such that the bonus song and the bangup tune are simultaneously audible via at least one of the one or more audio output devices.

8. The computer-implemented method of claim 7, wherein at least one of the bonus song and the bangup tune are prerecorded audio files.

9. The computer-implemented method of claim 7, wherein playing the bonus song automatically begins play of the bangup tune.

10. The computer-implemented method of claim 7, further comprising, while the bangup tune is played, selectively varying a volume of the second audio track in accordance with a duration of the at least one bangup event.

11. The computer-implemented method of claim 7, wherein beginning to play the bangup tune comprises beginning to play a plurality of bangup audio tracks simultaneously and selectively unmuting one or more of the bangup audio tracks in accordance with a duration of the at least one bangup event.

12. The computer-implemented method of claim 7, wherein the bangup tune is made audible by decreasing a volume of the first audio track relative to a volume of the second audio track.

13. A machine-readable, non-transitory medium with instructions stored thereon, the instructions, when executed by one or more processors, causing at least one of the one or more processors to operate with one or more input devices, one or more display devices, and one or more audio output devices, to perform a method comprising:

receiving, via at least one of the one or more input devices, an input indicative of a wager from a player to initiate a wagering game, the wagering game including at least one bangup event in which accumulated awards are incrementally added to a player's credits;

triggering play of a bonus song on a first audio track and simultaneously beginning to play a bangup tune on a second audio track such that a rhythm of the bonus song and a rhythm of the bangup tune are synchronized to one another, wherein both. the bonus song and the bangup tune have equal lengths and wherein the second audio track is initially muted to reduce audibility of the bangup tune; and in response to the at least one bangup event occurring during the wagering game, unmuting the second audio track such that the bonus song and the bangup tune are simultaneously audible via at least one of the one or more audio output devices.

14. The machine-readable medium of claim 13, wherein at least one of the bonus song and the bangup tune are prerecorded audio files.

15. The machine-readable medium of claim 13, therein playing the bonus song automatically begins play of the bangup tune.

16. The machine-readable medium of claim 13, wherein playing the bangup tune comprises at least one of:

playing a plurality of bangup audio tracks simultaneously and selectively unmuting one or more of the bangup audio tracks in accordance with a duration of the at least one bangup event; and decreasing a volume of the first audio track relative to a volume of the second audio track.

* * * * *

UNITED STATES PATENT AND TRADEMARK OFFICE

CERTIFICATE OF CORRECTION

PATENT NO. : 8,435,118 B2
APPLICATION NO. : 12/742074
DATED : May 7, 2013
INVENTOR(S) : Beerhorst It is certified that error appears in the above-identified patent and that said Letters Patent is hereby corrected as shown below:

In the Specifications:

In column 4, line 21, delete “gape” and insert --game--, therefor

In column 6, line 63, delete “The” and insert --the--, therefor

In the Claims:

In column 7, line 49, in claim 2, delete “east” and insert --least--, therefor

In column 8, line 62, in claim 13, delete “both.” and insert --both--, therefor

In column 9, line 7, in claim 15, delete “therein” and insert --wherein--, therefor Signed and Sealed this
Third Day of September, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,435,118 B2
APPLICATION NO. : 12/742074
DATED : May 7, 2013
INVENTOR(S) : Ralph Beerhorst It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 219 days.

Signed and Sealed this
Eighth Day of September, 2015

Michelle K. Lee

Michelle K. Lee
*Director of the United States Patent and Trademark Office*